(12) United States Patent
Johnson et al.

(10) Patent No.: US 10,069,315 B2
(45) Date of Patent: Sep. 4, 2018

(54) POWER SUPPLY SYSTEM WITH AUTOMATIC SENSING MECHANISM AND METHOD OF OPERATION THEREOF

(71) Applicant: ClevX, LLC, Kirkland, WA (US)

(72) Inventors: Simon B. Johnson, Bonney Lake, WA (US); Lev M. Bolotin, Kirkland, WA (US)

(73) Assignee: CleVX, LLC, Kirkland, WA (US)

( * ) Notice: Subject to any disclaimer, the term of this patent is extended or adjusted under 35 U.S.C. 154(b) by 0 days.

(21) Appl. No.: 14/328,657

(22) Filed: Jul. 10, 2014

(65) Prior Publication Data

US 2015/0008880 A1 Jan. 8, 2015

Related U.S. Application Data

(63) Continuation of application No. 13/218,336, filed on Aug. 25, 2011, now abandoned.

(60) Provisional application No. 61/377,089, filed on Aug. 25, 2010.

(51) Int. Cl.
*H02J 7/00* (2006.01)

(52) U.S. Cl.
CPC ............ *H02J 7/0044* (2013.01); *H02J 7/007* (2013.01); *H02J 7/0054* (2013.01)

(58) Field of Classification Search
CPC .............................. H02J 7/0042; H02J 7/0054
USPC .......................................... 320/103, 114–115
See application file for complete search history.

(56) References Cited

U.S. PATENT DOCUMENTS

| | | | |
|---|---|---|---|
| 5,691,618 A * | 11/1997 | Kobayashi | ............ H02J 7/0042 320/115 |
| 5,835,366 A | 11/1998 | Pleso et al. | |
| 6,208,535 B1 | 3/2001 | Parks | |
| 6,326,767 B1 * | 12/2001 | Small | .................. H01M 2/1055 320/116 |
| 7,020,519 B2 | 3/2006 | Greatbatch et al. | |
| 7,042,161 B1 | 5/2006 | Konopka | |
| 7,069,447 B1 | 6/2006 | Corder | |
| 7,166,987 B2 | 1/2007 | Lee et al. | |
| 7,274,116 B2 | 9/2007 | Inoue et al. | |
| 7,375,494 B2 | 5/2008 | Daniel et al. | |
| 7,531,986 B2 | 5/2009 | Eager et al. | |
| 7,821,228 B2 | 10/2010 | Zhu et al. | |
| 7,863,856 B2 | 1/2011 | Sherman et al. | |
| 7,956,576 B2 | 6/2011 | Neu et al. | |
| 8,004,237 B2 | 8/2011 | Manor et al. | |
| 8,111,042 B2 | 2/2012 | Bennett | |
| 8,415,923 B2 | 4/2013 | Forsythe | |
| 8,513,914 B2 | 8/2013 | Tan et al. | |
| 8,832,440 B2 | 9/2014 | Johnson et al. | |

(Continued)

OTHER PUBLICATIONS

"U.S. Appl. No. 13/218,336, Final Office Action dated Apr. 10, 2014", 17.

(Continued)

*Primary Examiner* — David V Henze-Gongola
(74) *Attorney, Agent, or Firm* — Schwegman Lundberg & Woessner, P.A.

(57) ABSTRACT

A method of operation of a power supply system includes: providing a source voltage with a power source; generating a device voltage with the source voltage; monitoring the source voltage and the device voltage; and supplying the device voltage to a mobile device with the device voltage controlled by a control unit.

20 Claims, 7 Drawing Sheets

(56) References Cited

U.S. PATENT DOCUMENTS

| | | |
|---|---|---|
| 9,075,571 B2 | 7/2015 | Bolotin et al. |
| 9,262,611 B2 | 2/2016 | Johnson et al. |
| 2006/0006850 A1* | 1/2006 | Inoue .................... H02J 7/0065 323/265 |
| 2006/0103344 A1* | 5/2006 | Hassan ................... G06F 1/266 320/103 |
| 2007/0241721 A1 | 10/2007 | Weinstein et al. |
| 2008/0197801 A1 | 8/2008 | Manor et al. |
| 2009/0128090 A1 | 5/2009 | Bi |
| 2010/0066311 A1* | 3/2010 | Bao ....................... H02J 7/0073 320/162 |
| 2010/0188235 A1* | 7/2010 | Asano ................... G08B 17/107 340/578 |
| 2011/0074360 A1* | 3/2011 | Kerr ..................... H02J 7/0054 320/137 |
| 2011/0095728 A1* | 4/2011 | Chen .................... H02J 7/0055 320/162 |
| 2011/0187324 A1 | 8/2011 | Tan et al. |
| 2012/0049800 A1 | 3/2012 | Johnson et al. |
| 2016/0119339 A1 | 4/2016 | Bolotin et al. |
| 2016/0259736 A1 | 9/2016 | Bolotin et al. |

OTHER PUBLICATIONS

"U.S. Appl. No. 13/218,336, Non Final Office Action dated Sep. 13, 2013", 19 pgs.

"U.S. Appl. No. 13/218,336, Response filed Dec. 16, 2013 to Non Final Office Action dated Sep. 13, 2013", 11 pgs.

* cited by examiner

POWER SUPPLY SYSTEM WITH AUTOMATIC SENSING MECHANISM AND METHOD OF OPERATION THEREOF

CROSS-REFERENCE TO RELATED APPLICATION

This is a continuation of co-pending U.S. patent application Ser. No. 13/218,336 filed Aug. 25, 2011, which claims the benefit of U.S. Provisional Patent Application Ser. No. 61/377,089 filed Aug. 25, 2010, and the subject matter thereof is incorporated herein by reference thereto.

TECHNICAL FIELD

The present invention relates generally to a power supply system and more particularly to a system with sensing mechanism.

BACKGROUND ART

Cellular phones are very popular and are being equipped with an ever-increasing number of features. No longer is a cell phone strictly used for making calls, but it can also be used as a camera, a global positioning system (GPS) navigation device, a video camera, or a video player to name a few. As the number of uses and time of uses increase, so is the amount of power required.

Users want their mobile devices equipped with the largest possible battery. Frequent recharges means one has to stay in proximity to a power source, such as an alternating current (A/C) or automotive power source. For some movie viewing devices, such as high-end cell phones (e.g., iPhone and smartphones), the devices must be connected to a power outlet in order to avoid their batteries from being drained completely and not being able to complete the movie. Other smartphone features such as enabling GPS and fourth-generation wireless (4G) put added strain on an already overburdened battery.

Thus, a need still remains for reliable and efficient power supply system. In view of demands for increasing power in mobile devices with ever-increasing number of features, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a power supply system, including: providing a source voltage with a power source; generating a device voltage with the source voltage; monitoring the source voltage and the device voltage; and supplying the device voltage to a mobile device with the device voltage controlled by a control unit.

The present invention provides a power supply system, including: a power source for providing a source voltage; a booster unit, coupled to the power source, for generating a device voltage with the source voltage; a control unit, coupled to the booster unit, for monitoring the source voltage and the device voltage; and a device connector, coupled to the booster unit, for supplying the device voltage to a mobile device with the device voltage controlled by the control unit.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
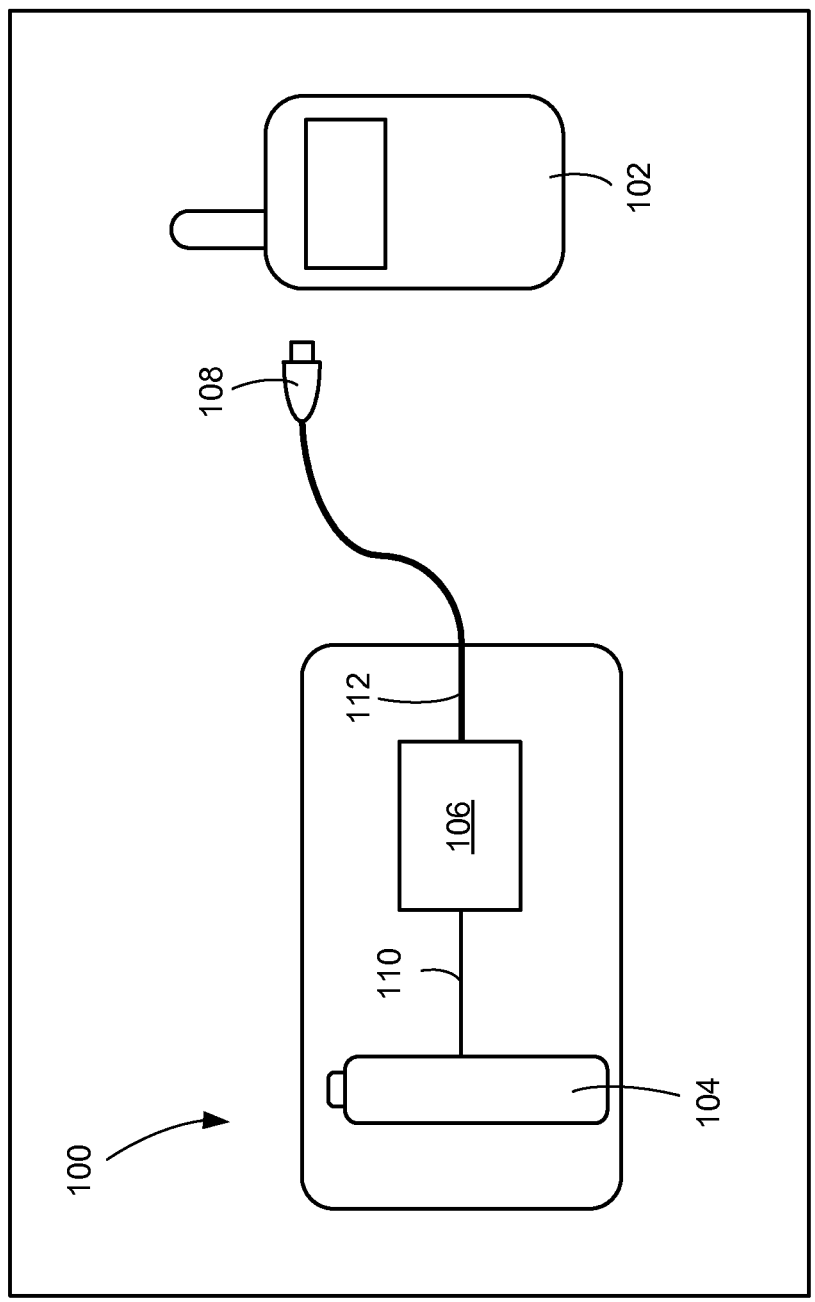
FIG. 1 is a block diagram of a power supply system in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc.

as a matter of descriptive convenience and are not intended to have any other significance or provide limitations for the present invention.

There are a number of auxiliary power devices on the market for extending the run time of cellular phones and thus allowing continued operation beyond the phone's expected battery life. Many of these power devices are equipped with a Lithium Polymer (Li-Polymer) battery and charge from a Universal Serial Bus (USB) port.

Others use conventional batteries (e.g. alkaline batteries) whose output voltage is boosted in order to be compatible with a phone's power port. Unfortunately, many of these devices do not extend phone life significantly.

Phones typically require a 5-volt supply capable of delivering around 500 milliamps (ma) of current in order to recharge their internal batteries. Manufacturers of auxiliary power devices often fail to take into account the limitations of their power sources.

For example, a "Turbo Charge TC400" portable cell phone charger uses a single AA alkaline battery to power a cell phone. While a typical AA battery has a capacity of 2700 milliamp-hours (mAh), it falls short of being able to power a cell phone because:

a) 1.5 volts need to be boosted to 5 volts,
b) The amount of current required from the alkaline battery is proportional to the amount the voltage boosted, and
c) Alkaline batteries cannot maintain their output voltage under high current loads.

Thus, if a cell phone requires 300 mA of charging current, an AA battery will have to deliver 1 amp to create 5 volts at the cell phone, calculated as follow.

Charging current=300 mA*5/1.5=1.0 amp

An alkaline battery is not capable of delivering currents of this magnitude. Drawing these types of currents causes an alkaline battery output voltage to drop causing a booster circuit to draw more current.

If the battery output voltage drops to 1 volt, the battery will then have to deliver 1.5 amps to maintain 5 volts at the cell phone. In this case, an auxiliary power source equipped with a single AA battery quickly overheats causing problems that create a dangerous situation where the battery can leak or discharge toxic gases.

A booster circuit is often used in auxiliary power supplies to adjust their internal battery voltage to be compatible for cell phones. Booster circuits are not a hundred percent efficient and require power to operate. Thus, many auxiliary power supplies are equipped with a button or a switch to turn on/off the booster circuits so as not to drain the auxiliary power's battery.

If the booster circuits are left on, problems can occur where the auxiliary power supplies can self-discharge in a few days causing available capacity to degrade rapidly. In addition, problems can occur when a user forgets to turn off an auxiliary power source or engage it accidentally. Embodiments of the present invention provide solutions or answers to the problems.

Referring now to FIG. 1, therein is shown a block diagram of a power supply system 100 in a first embodiment of the present invention. The block diagram depicts the power supply system 100 and a mobile device 102.

The power supply system 100 can include a load sensing mechanism. The power supply system 100 can include a battery powered booster module for mobile devices. For example, the power supply system 100 can represent an auxiliary power supply.

As an example, the mobile device 102 can represent a cellular phone, a smart phone, or a portable device. As a specific example, the mobile device 102 can represent an iPod™.

The power supply system 100 can include a power source 104, which is defined as a device that supplies electricity. For example, the power source 104 can include one or more batteries. Also for example, the power source 104 can include a replaceable power source, a rechargeable power source, or a portable power source including a battery. For a specific example, the power source 104 can include alkaline, nickel metal hydride (NiMH), nickel cadmium (NiCd), or lithium polymer (Li-Polymer).

The power supply system 100 can include a booster module 106, which is defined as a unit with electronics that converts a voltage generated by the power source 104 to another voltage. The booster module 106 can be coupled or connected to the power source 104. The booster module 106 can generate a voltage that is compatible for the mobile device 102 to operate.

The power supply system 100 can include a device connector 108, which is defined as a conductor that transmits electrical power. The device connector 108 can be connected or coupled to the booster module 106 and the mobile device 102. The device connector 108 can provide a voltage from the booster module 106 to the mobile device 102.

For example, the device connector 108 can represent a plug that can be connected to a power jack including a phone jack of the mobile device 102. Also for example, the device connector 108 can represent a mobile device jack.

The power source 104 can provide a source voltage 110, which is defined as an output voltage of the power source 104, supplied to the booster module 106. For example, the source voltage 110 can represent a battery voltage.

The booster module 106 can provide a device voltage 112, which is defined as an output voltage of the booster module 106 that is compatible for powering the mobile device 102. For example, the device voltage 112 can represent a phone voltage.

As an example, the power source 104 can represent a Li-Polymer type generating a voltage of 3.7 volts. The booster module 106 can convert this voltage to 5 volts compatible for powering the mobile device 102.

As another example, the power source 104 can have an electric charge capacity of 1000 milliampere-hours (mAh). Due to conservation of power, the boosting effect of the booster module 106 will reduce the electric charge capacity available from the power source 104. With an output voltage of 5 volts from the booster module 106, an effective capacity that is available from the power source 104 can be calculated as follows.

Effective capacity=3.7/5.0*1000 mAh=740 mAh

The booster module 106 can be coupled to the power source 104 and the mobile device 102. The booster module 106 can generate the device voltage 112 from or with the source voltage 110 provided by the power source 104.

Figure 2:
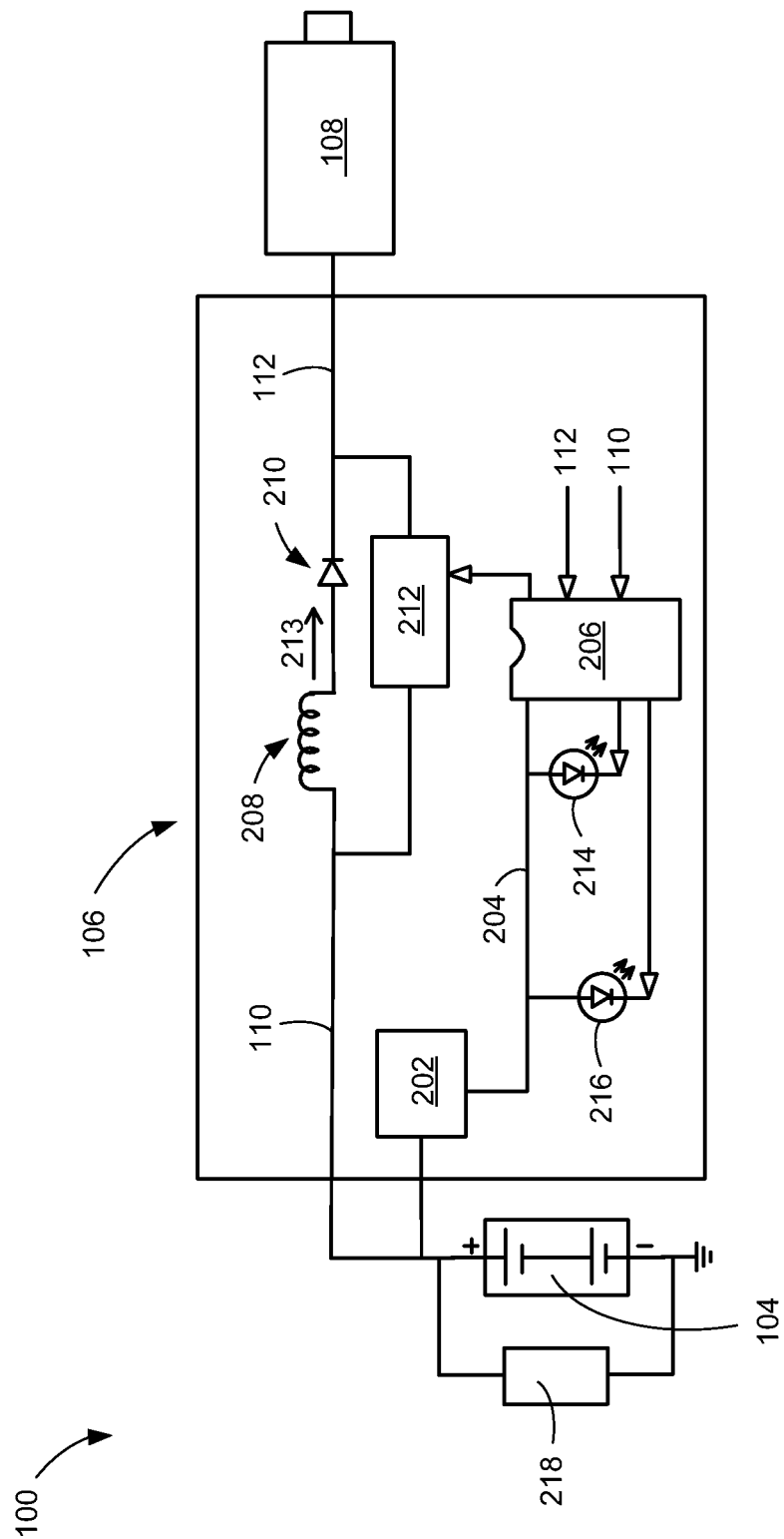
FIG. 2 is a detailed hardware block diagram of the power supply system.

Referring now to FIG. 2, therein is shown a detailed hardware block diagram of the power supply system 100. The detailed hardware block diagram can include a circuitry of the power supply system 100.

The power supply system 100 can provide the power source 104 connected to the booster module 106. The power supply system 100 can include the device connector 108 connected to the booster module 106. The power source 104 can provide the source voltage 110. The source voltage 110 can be supplied to power components of the booster module 106.

The booster module 106 can include a voltage reference unit 202, which is defined as a component that supplies a voltage as a reference to other units of the booster module 106. The voltage reference unit 202 can be connected to the power source 104. The voltage reference unit 202 can generate a reference voltage 204 based on the source voltage 110. The voltage reference unit 202 can generate the reference voltage 204 by converting the source voltage 110 to a voltage that can be used to power other units of the booster module 106.

The booster module 106 can include a control unit 206, which is defined as a component that controls the operation of the booster module 106. The control unit 206 can be connected to the voltage reference unit 202.

For example, the control unit 206 can be implemented in a number of different manners. For a specific example, the control unit 206 can be implemented with a micro-controller, a processor, a microprocessor, a hardware control logic, a hardware finite state machine, or a combination thereof.

The booster module 106 can include an inductor 208 connected to the power source 104. The booster module 106 can include a diode 210 connected to and in series with the inductor 208. The booster module 106 can include a booster unit 212, which is defined as a component that controls the boost operation of the booster module 106 to increase the source voltage 110 provided by the power source 104. The booster unit 212 is connected in parallel with the inductor 208 and the diode 210.

The booster unit 212 can be powered or sourced by the source voltage 110. For example, the booster unit 212 can include boost control. The booster unit 212 can be controlled by the control unit 206 for generation of the device voltage 112.

The booster module 106 can provide the device voltage 112. Outputs of the diode 210 and the booster unit 212 can provide the device voltage 112. The device voltage 112 can be supplied to the mobile device 102 of FIG. 1.

The device voltage 112 can be supplied to the mobile device 102 with the device connector 108 connected to outputs of the diode 210 and the booster unit 212. The device voltage 112 can be supplied to the device connector 108. The voltage reference unit 202 can generate the reference voltage 204 to create a reference point for the control unit 206 to analyze the source voltage 110 and the device voltage 112.

The control unit 206 can control the booster unit 212 by the control unit 206 enabling or disabling the booster unit 212. The control unit 206 can start by turning off or disabling the booster unit 212. The inductor 208 can function as a direct current (DC) conductor allowing or setting the device voltage 112 equal the source voltage 110 when the mobile device 102 is not connected to the device connector 108.

The mobile device 102 connected to the device connector 108 can draw a certain amount of power causing the device voltage 112 to drop as the diode 210 acts or functions as a bias voltage diode. This reduction in voltage in the device voltage 112 can be sensed or detected by the control unit 206 when the booster unit 212 is turned on or enabled. The mobile device 102 attached to the device connector 108 can draw enough current to cause the source voltage 110 to sag or become weaker such that the device voltage 112 is significantly greater than the source voltage 110.

For example, if the power source 104 includes 4-NiMH type, the source voltage 110 can be approximately equal to 5 volts. With the booster unit 212 off or disabled, the inductor 208 can act or function as a short making the device voltage 112 approximately equal to 5 volts as well under no-load conditions, which are defined as states of the power supply system 100 when the mobile device 102 is not connected to the device connector 108.

When the mobile device 102 is connected to the device connector 108, an electric current 213 can begin to drain from the power source 104 and conduct across the diode 210. The device voltage 112 can begin to sag or become weaker to a voltage of, for example, 4.7 volts. An amount of the device voltage 112 that sags or decreases can be based on a charge status of or an amount of energy stored or remained in the power source 104. The power source 104 that is freshly or fully charged can sag less or become less weak than the power source 104 that is older or not fully charged.

The control unit 206 can control the booster unit 212. The booster unit 212 can be controlled by the control unit 206 monitoring the source voltage 110 and the device voltage 112. The booster unit 212 can be controlled by the control unit 206 in response to changes in the source voltage 110 and the device voltage 112.

The control unit 206 can monitor the source voltage 110 and the device voltage 112 for detection of changes in the source voltage 110 and the device voltage 112. The control unit 206 can turn on or off by enabling or disabling, respectively, the booster unit 212 in response to changes in the source voltage 110 and the device voltage 112.

By comparing the source voltage 110 to the device voltage 112, the control unit 206 can be able to determine or detect a number of conditions. One of the conditions can include detection of the mobile device 102. When the mobile device 102 is not connected to the device connector 108, including a scenario when there is no phone present, the device voltage 112 can be approximately equal to the source voltage 110. When the mobile device 102 is connected to the device connector 108, a sudden voltage drop can occur across the diode 210 such that the device voltage 112 can decrease to be less than the source voltage 110.

Another of the conditions can include detection of when the mobile device 102 has been completely charged. In this condition, the source voltage 110 can rise or increase as the electric current 213 drained by the mobile device 102 gets less or decreases. The electric current 213 can eventually level off or become substantially constant.

Yet another of the conditions can include detection of when the mobile device 102 is disconnected. In this condition, the source voltage 110 can suddenly rise. A sudden rise in the source voltage 110 can be determined when an increase in electric potential difference is detected to be greater than or equal to a preset threshold during a predetermined amount of time.

Yet another of the conditions can include detection of the power source 104 in a low charge state. In this state, the power source 104 can be too low to continue functioning as an auxiliary power. The low state can be determined when the source voltage 110 is less than a preset threshold. For example, the low state can represent a low internal battery condition. For a specific example, the low state can be detected when the source voltage 110 is less than 4 volts.

The booster module 106 can include a charge indicator 214, which is defined as a component that outputs a charge or discharge state of the mobile device 102. The charge indicator 214 can be powered by the reference voltage 204. The charge indicator 214 can be controlled by the control unit 206 to output, show, or display a charge or discharge status of the mobile device 102.

For example, the charge indicator 214 can be implemented with a transducer, which converts electrical energy to light. For a specific example, the charge indicator 214 can be implemented with a light-emitting diode (LED).

The booster module 106 can include a boost indicator 216, which is defined as a component that outputs a boost state of the booster module 106. The boost indicator 216 can be powered by the reference voltage 204. The boost indicator 216 can be controlled by the control unit 206 to output or show a boost state of the booster module 106.

For example, the boost indicator 216 can be implemented with a transducer, which converts electrical energy to light. For a specific example, the boost indicator 216 can be implemented with a light-emitting diode (LED).

The booster module 106 can include a charge circuit 218, which is defined as an electronic device that is used to store energy into a secondary cell or rechargeable battery by forcing an electric current therethrough. The charge circuit 218 can recharge the power source 104.

The power source 104 can be coupled to the voltage reference unit 202, the inductor 208, the booster unit 212, and the charge circuit 218. The power source 104 can provide the source voltage 110 to the voltage reference unit 202, the inductor 208, and the booster unit 212. The power source 104 can be charged by the charge circuit 218, which can be connected to an external supply including alternating current (A/C) or Universal Serial Bus (USB) 5 volts.

The voltage reference unit 202 can be coupled to the power source 104, the control unit 206, the charge indicator 214, and the boost indicator 216. The voltage reference unit 202 can generate the reference voltage 204 supplied to the control unit 206, the charge indicator 214, and the boost indicator 216.

The booster unit 212 can be coupled to the device connector 108, the inductor 208, and the diode 210. The booster unit 212 can be controlled by the control unit 206 for generation of the device voltage 112 with the source voltage 110.

The control unit 206 can be coupled to the power source 104, the diode 210, and the booster unit 212. The control unit 206 can monitor the source voltage 110 and the device voltage 112 with the reference voltage 204 supplied to the control unit 206 by the voltage reference unit 202.

It has been discovered that the control unit 206 monitoring the source voltage 110 and the device voltage 112 to control the booster unit 212 improves operation of the mobile device 102 by extending run time of the mobile device 102 and thus allowing continued operation beyond expected battery life of the mobile device 102.

It has also been discovered that the booster unit 212 enabled or disabled by the control unit 206 to adjust the device voltage 112 to be compatible with an operation voltage of the mobile device 102 provides efficient auxiliary power devices thereby eliminating a need for a button to manually turn on/off the booster unit 212 and thus not unnecessarily drain the power source 104.

It has further been discovered that the reference voltage 204 provided by the voltage reference unit 202 allows the control unit 206 to effectively enable the booster unit 212 when the mobile device 102 is connected to the device connector 108 and disable the booster unit 212 when either the mobile device 102 is fully charged or when the mobile device 102 is not connected to the device connector 108.

It has yet further been discovered that the booster unit 212 controlled by the control unit 206 provides improved reliability by eliminating possible overheat of the power source 104 causing dangerous situations where batteries can leak or discharge toxic gases particularly when the source voltage 110 is not monitored by the control unit 206 and drops below a certain voltage, the booster unit 212 is unnecessarily turned on, and an increase of current drawn from the power source 104 occurs in order to maintain the device voltage 112 at a required voltage level for proper operation of the mobile device 102.

Figure 3:
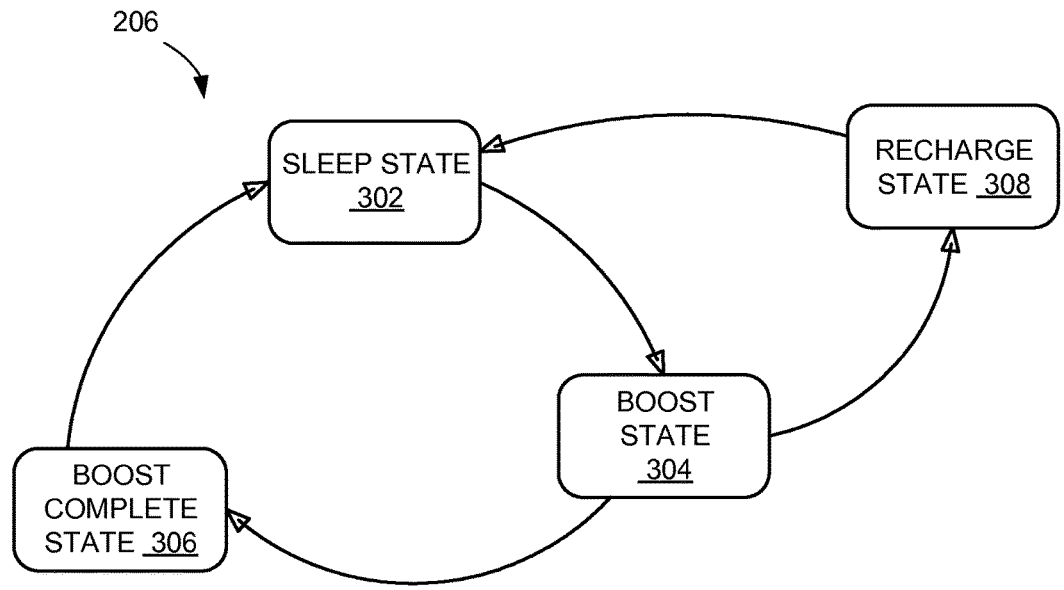
FIG. 3 is a state transition diagram of the control unit.

Referring now to FIG. 3, therein is shown a state transition diagram of the control unit 206. The state transition diagram depicts the control unit 206. In a sleep state 302, the control unit 206 can determine that the power source 104 of FIG. 1 is in a sleep status until the mobile device 102 of FIG. 1 is present or detected. The mobile device 102 can be detected as present when a sudden drop or decrease in the device voltage 112 of FIG. 1 is detected with the mobile device 102 connected to the device connector 108 of FIG. 1.

In the sleep state 302, the control unit 206 can transition to a boost state 304 when the mobile device 102 is detected as present. In the boost state 304, the booster unit 212 of FIG. 2 can be enabled by the control unit 206. The source voltage 110 of FIG. 1 can be continuously monitored. As the mobile device 102 reaches approximately full charge, an amount of the electric current 213, which is drawn from the power source 104, can be detected as decreasing and eventually leveling off to an approximately constant current.

If the booster unit 212 is momentarily turned off or on, the source voltage 110 can be very close to or approximately equal to the device voltage 112 when the mobile device 102 is approximately completely charged. In other words, there can be a small change in the source voltage 110 when the booster unit 212 is disabled or enabled.

In the boost state 304, the control unit 206 can transition to a boost complete state 306 when the source voltage 110 is detected as being very close or approximately equal to the device voltage 112. In the boost state 304, the control unit 206 can transition to a recharge state 308 to recharge the power source 104 if the source voltage 110 is detected as dropping below a predetermined threshold.

The predetermined threshold is defined as a predetermined voltage level of the power source 104, below which the power source 104 does not have an adequate charge to provide sufficient operation power. For example, the predetermined threshold can represent a critical threshold. Also for example, the predetermined threshold can be 1.0 volt.

In the recharge state 308, the control unit 206 can transition to the sleep state 302 if the mobile device 102 is unplugged from the device connector 108 when the device voltage 112 is approximately equal to the source voltage 110. When the mobile device 102 is unplugged, a no-load condition occurs. In the boost complete state 306, the control unit 206 can transition to the sleep state 302 when the device voltage 112 is approximately equal to the source voltage 110. In the boost complete state 306, the control unit 206 can disable the booster unit 212.

Figure 4:
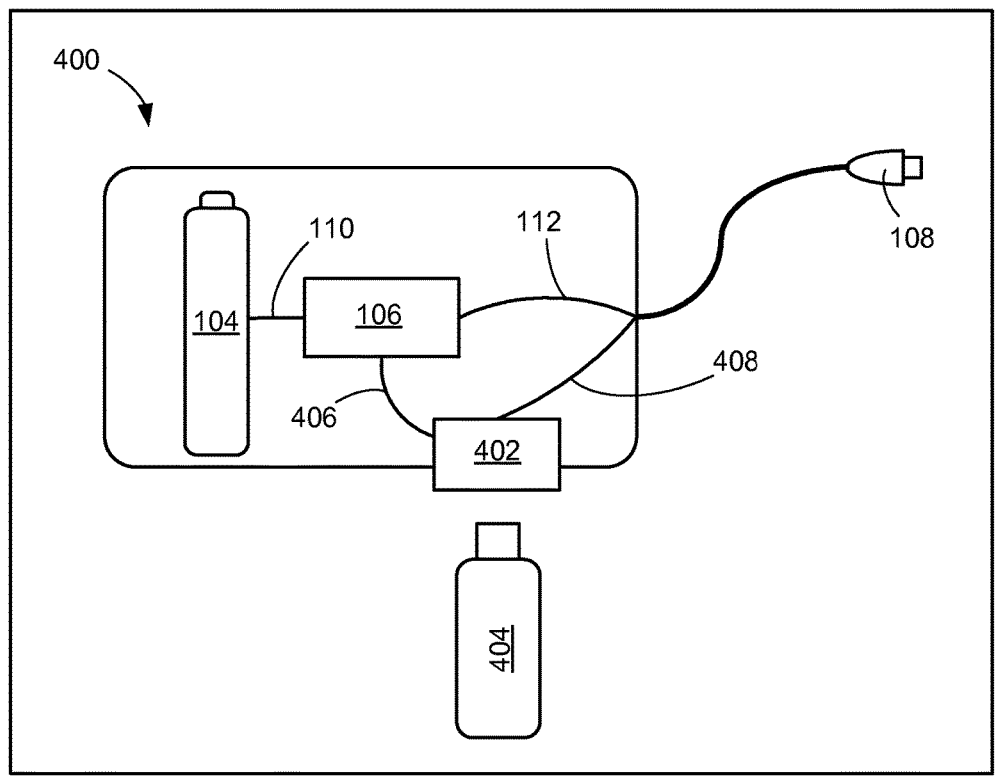
FIG. 4 is a block diagram of a power supply system in a second embodiment of the present invention.

Referring now to FIG. 4, therein is shown a block diagram of a power supply system 400 in a second embodiment of the present invention. The power supply system 400 can be similar to the power supply system 100 of FIG. 1. In a manner similar to the power supply system 100, the power supply system 400 includes the power source 104, the booster module 106, and the device connector 108.

In a manner similar to the power supply system 100, the power source 104 includes the source voltage 110, and the booster module 106 includes the device voltage 112. Although not shown, the booster module 106 includes the voltage reference unit 202 of FIG. 2, the reference voltage 204 of FIG. 2, the control unit 206 of FIG. 2, the inductor 208 of FIG. 2, the diode 210 of FIG. 2, the booster unit 212 of FIG. 2, the charge indicator 214 of FIG. 2, the boost indicator 216 of FIG. 2, and the charge circuit 218 of FIG. 2.

The power supply system 100 can include a device port 402, which is defined as a conductor that transmits electrical power and data. The device port 402 can be connected or coupled to the booster module 106 and the device connector 108. For example, the device port 402 can represent a memory connector port, a Universal Serial Bus (USB) connector, a mini USB connector, or a micro USB connector.

The device port 402 can provide a voltage from the booster module 106 to an external device 404, which is defined as a device for storing data. The booster module 106 can provide an external voltage 406, which is defined as an electric potential that is compatible for powering the external device 404.

The device port 402 can be coupled to the booster unit 212, which can generate the external voltage 406 provided to the device port 402. The control unit 206 can monitor the external voltage 406 and the source voltage 110 to control the booster unit 212 for generation of the external voltage 406.

The external device 404 can be connected to the device port 402. For example, the external device 404 can represent a mass storage device, a Universal Serial Bus (USB) flash drive, a removable and rewritable memory device.

The device port 402 can function as a port for charging the external device 404 with the external voltage 406. The device port 402 can provide a data interface 408, which is defined as a connection for transferring data between the device port 402 and the device connector 108.

The device port 402 supplied with the external voltage 406 and having the data interface 408 can facilitate parallel use of being able to supply power to the external device 404 at the same time data is being synchronized with the external device 404. For example, the mobile device 102 of FIG. 1 can be charged at the same time data is being transferred between the mobile device 102 and the external device 404. As the mobile device 102 includes more computer-like functions, data back-up can become increasingly important just as it has with personal computers.

The external voltage 406 and the device voltage 112 can be supplied by the booster unit 212. The booster unit 212 can optionally generate the same voltage for the external voltage 406 and the device voltage 112.

The device voltage 112 can be supplied to the device connector 108. At the same time, the external voltage 406 can be supplied to the device port 402 for powering the external device 404.

It has been discovered that the control unit 206 monitoring the source voltage 110 and the device voltage 112 to control the booster unit 212 improves operation of the mobile device 102 by extending run time of the mobile device 102 and thus allowing continued operation beyond expected battery life of the mobile device 102.

It has also been discovered that the booster unit 212 enabled or disabled by the control unit 206 to adjust the device voltage 112 to be compatible with an operation voltage of the mobile device 102 provides efficient auxiliary power devices thereby eliminating a need for a button to manually turn on/off the booster unit 212 and thus not unnecessarily drain the power source 104.

It has further been discovered that the reference voltage 204 provided by the voltage reference unit 202 allows the control unit 206 to effectively enable the booster unit 212 when the mobile device 102 is connected to the device connector 108 and disable the booster unit 212 when either the mobile device 102 is fully charged or when the mobile device 102 is not connected to the device connector 108.

It has yet further been discovered that the booster unit 212 controlled by the control unit 206 provides improved reliability by eliminating possible overheat of the power source 104 causing dangerous situations where batteries can leak or discharge toxic gases particularly when the source voltage 110 is not monitored by the control unit 206 and drops below a certain voltage, the booster unit 212 is unnecessarily turned on, and an increase of current drawn from the power source 104 occurs in order to maintain the device voltage 112 at a required voltage level for proper operation of the mobile device 102.

It has yet further been discovered that the device port 402 having the data interface 408 provides improved support for operation of the mobile device 102 by providing data transfer between the external device 404 and the mobile device 102 while providing the external voltage 406 to the external device 404.

Figure 5:
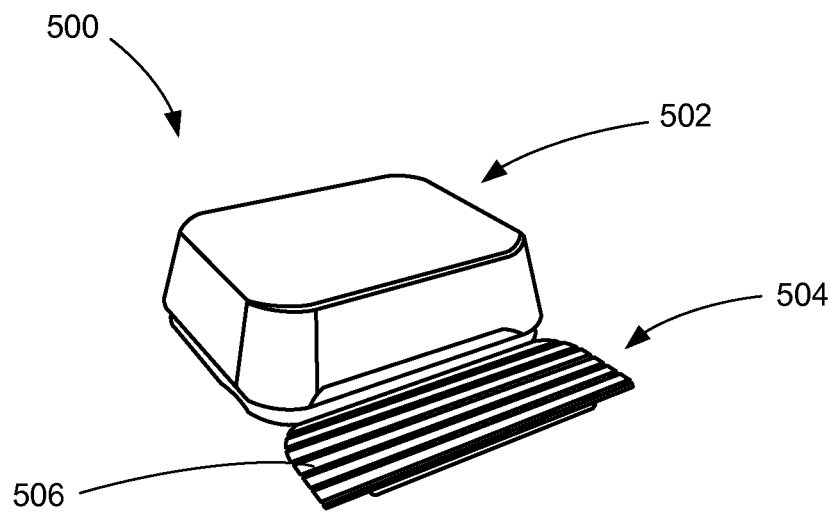
FIG. 5 is an isometric view of a power supply system in a third embodiment of the present invention.

Referring now to FIG. 5, therein is shown an isometric view of a power supply system 500 in a third embodiment of the present invention. The power supply system 500 can be similar to the power supply system 100 of FIG. 1.

Although not shown, the power supply system 500 includes the power source 104 of FIG. 1, the booster module 106 of FIG. 1, the device connector 108 of FIG. 1, the source voltage 110 of FIG. 1, and the device voltage 112 of FIG. 1. Although not shown, the booster module 106 includes the voltage reference unit 202 of FIG. 2, the reference voltage 204 of FIG. 2, the control unit 206 of FIG. 2, the inductor 208 of FIG. 2, the diode 210 of FIG. 2, the booster unit 212 of FIG. 2, the charge indicator 214 of FIG. 2, the boost indicator 216 of FIG. 2, and the charge circuit 218 of FIG. 2.

The power supply system 500 can include a case 502, which is defined as a frame that covers electronics of the power supply system 500. The case 502 covers the power source 104, the voltage reference unit 202, the control unit 206, the inductor 208, the diode 210, the booster unit 212, the charge indicator 214, the boost indicator 216, and the charge circuit 218 of FIG. 2.

The power supply system 500 can include a view support 504, which is defined as a structure that provides support for the mobile device 102 of FIG. 1. The view support 504 can be horizontally attached or connected to a non-horizontal surface of the case 502.

The view support 504 holds the mobile device 102 such that when the mobile device 102 tilts back against the case 502, the mobile device 102 can be easily viewed without having to hold in one's hand. The view support 504 can include a support mechanism with a support surface 506 that is non-skid and planar allowing the mobile device 102 to be reliably supported thereon.

Viewing a movie with the mobile device 102 can drain an internal battery of the mobile device 102. For example, it can be difficult to view 2 hours of movie since the internal battery of the mobile device 102 is incapable of providing sufficient power for an extended period. The power supply system 500 being able to support the mobile device 102 for viewing with the view support 504 while the mobile device 102 being connected via the device connector 108 to the power source 104 is a natural extension of the present invention.

It has been discovered that the control unit 206 monitoring the source voltage 110 and the device voltage 112 to control the booster unit 212 improves operation of the mobile device 102 by extending run time of the mobile device 102 and thus allowing continued operation beyond expected battery life of the mobile device 102.

It has also been discovered that the booster unit 212 enabled or disabled by the control unit 206 to adjust the device voltage 112 to be compatible with an operation voltage of the mobile device 102 provides efficient auxiliary power devices thereby eliminating a need for a button to manually turn on/off the booster unit 212 and thus not unnecessarily drain the power source 104.

It has further been discovered that the reference voltage 204 provided by the voltage reference unit 202 allows the control unit 206 to effectively enable the booster unit 212 when the mobile device 102 is connected to the device connector 108 and disable the booster unit 212 when either the mobile device 102 is fully charged or when the mobile device 102 is not connected to the device connector 108.

It has yet further been discovered that the booster unit 212 controlled by the control unit 206 provides improved reliability by eliminating possible overheat of the power source 104 causing dangerous situations where batteries can leak or discharge toxic gases particularly when the source voltage 110 is not monitored by the control unit 206 and drops below a certain voltage, the booster unit 212 is unnecessarily turned on, and an increase of current drawn from the power source 104 occurs in order to maintain the device voltage 112 at a required voltage level for proper operation of the mobile device 102.

It has yet further been discovered that the view support 504 provides improved reliability by providing the support surface 506 as a non-skid surface and thus a stable surface for the mobile device 102 to be placed thereon while the mobile device 102 is being charged or used for viewing purposes.

Figure 6:
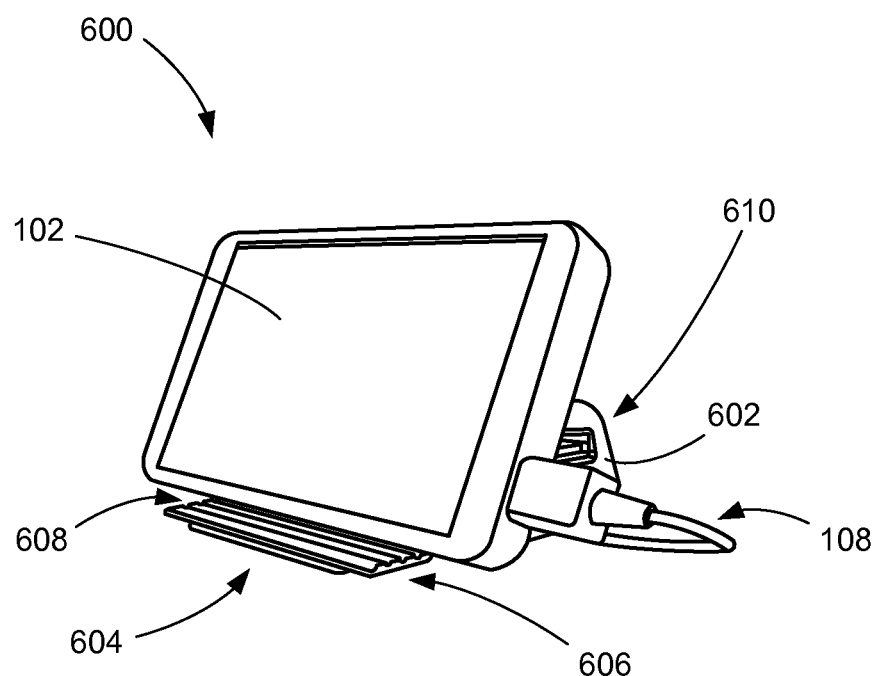
FIG. 6 is an isometric view of a power supply system in a fourth embodiment of the present invention.

Referring now to FIG. 6, therein is shown an isometric view of a power supply system 600 in a fourth embodiment of the present invention. The power supply system 600 can be similar to the power supply system 100 of FIG. 1.

Although not shown, the power supply system 600 includes the power source 104 of FIG. 1 and the booster module 106 of FIG. 1. The isometric view depicts the power supply system 600 having the device connector 108 connected to the mobile device 102. Although not shown, the power supply system 600 includes the source voltage 110 of FIG. 1, and the device voltage 112 of FIG. 1.

Although not shown, the booster module 106 includes the voltage reference unit 202 of FIG. 2, the reference voltage 204 of FIG. 2, the control unit 206 of FIG. 2, the inductor 208 of FIG. 2, and the diode 210 of FIG. 2. Although not shown, the booster module 106 includes the booster unit 212 of FIG. 2, the charge indicator 214 of FIG. 2, the boost indicator 216 of FIG. 2, and the charge circuit 218 of FIG. 2.

The power supply system 600 can include a case 602, which is defined as a frame that covers electronics of the power supply system 600. The power supply system 600 can include a view support 604, which is defined as a structure that provides support for the mobile device 102 of FIG. 1. The view support 604 can be horizontally attached or connected to a non-horizontal surface of the case 602.

The view support 604 holds the mobile device 102 such that when the mobile device 102 tilts back against the case 602, the mobile device 102 can be easily viewed without having to hold in one's hand. The view support 604 can include a support mechanism with a support surface 606 that is non-skid allowing the mobile device 102 to be reliably supported.

The mobile device 102 can be positioned directly on the view support 604 at an acute angle between the support surface 606 and a back surface of the mobile device 102 for optimum viewing while the mobile device 102 is connected to the power supply system 600. The view support 604 can include a number of ridges 608 at the support surface 606 for supporting different size display devices.

The power supply system 600 can include device ports 610, which are defined as conductors that transmit electrical power and data for external devices (not shown). The device ports 610 can be provided at a non-horizontal surface of the case 602.

The device ports 610 can be connected or coupled to the booster module 106 and the device connector 108. For example, the device ports 610 can represent Universal Serial Bus (USB) connectors, mini USB connectors, or micro USB connectors.

It has been discovered that the control unit 206 monitoring the source voltage 110 and the device voltage 112 to control the booster unit 212 improves operation of the mobile device 102 by extending run time of the mobile device 102 and thus allowing continued operation beyond expected battery life of the mobile device 102.

It has also been discovered that the booster unit 212 enabled or disabled by the control unit 206 to adjust the device voltage 112 to be compatible with an operation voltage of the mobile device 102 provides efficient auxiliary power devices thereby eliminating a need for a button to manually turn on/off the booster unit 212 and thus not unnecessarily drain the power source 104.

It has further been discovered that the reference voltage 204 provided by the voltage reference unit 202 allows the control unit 206 to effectively enable the booster unit 212 when the mobile device 102 is connected to the device connector 108 and disable the booster unit 212 when either the mobile device 102 is fully charged or when the mobile device 102 is not connected to the device connector 108.

It has yet further been discovered that the booster unit 212 controlled by the control unit 206 provides improved reliability by eliminating possible overheat of the power source 104 causing dangerous situations where batteries can leak or discharge toxic gases particularly when the source voltage 110 is not monitored by the control unit 206 and drops below a certain voltage, the booster unit 212 is unnecessarily turned on, and an increase of current drawn from the power source 104 occurs in order to maintain the device voltage 112 at a required voltage level for proper operation of the mobile device 102.

It has yet further been discovered that the view support 604 provides improved reliability by providing the ridges 608 at the support surface 606 for the mobile device 102 to be placed thereon while the mobile device 102 is being charged or used for viewing purposes.

It has yet further been discovered that the device ports 610 provide increased storage capacity with the device ports 610 providing additional connection ports for additional devices, such as a mass storage device or a flash drive, to be connected.

Figure 7:
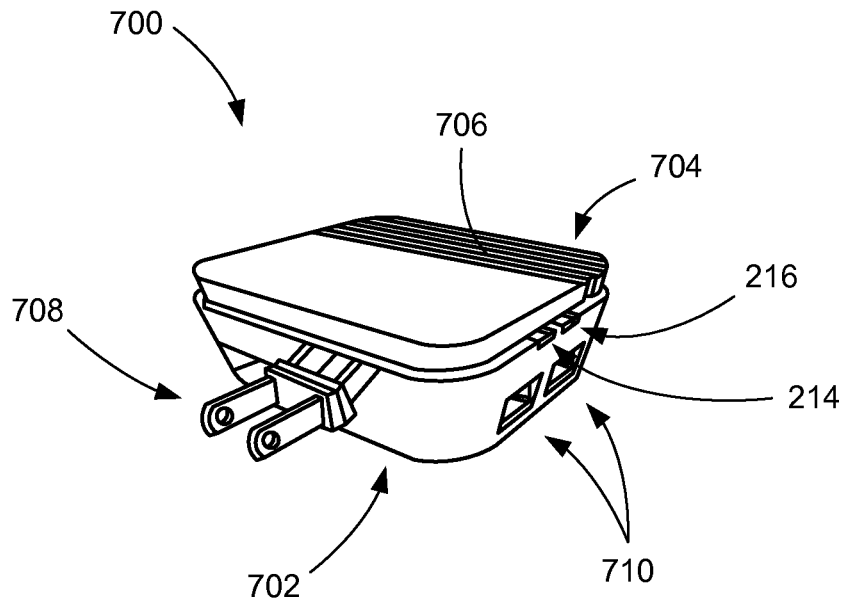
FIG. 7 is an isometric view of a power supply system in a fifth embodiment of the present invention.

Referring now to FIG. 7, therein is shown an isometric view of a power supply system 700 in a fifth embodiment of the present invention. The power supply system 700 can be similar to the power supply system 100 of FIG. 1.

Although not shown, the power supply system 700 includes the power source 104 of FIG. 1, the booster module 106 of FIG. 1, the device connector 108 of FIG. 1, the source voltage 110 of FIG. 1, and the device voltage 112 of FIG. 1. Although not shown, the booster module 106 includes the voltage reference unit 202 of FIG. 2, the reference voltage 204 of FIG. 2, the control unit 206 of FIG. 2, the inductor 208 of FIG. 2, the diode 210 of FIG. 2, the booster unit 212 of FIG. 2, the charge indicator 214, the boost indicator 216, and the charge circuit 218 of FIG. 2.

The power supply system 700 can include a case 702, which is defined as a frame that covers electronics of the power supply system 700. The power supply system 700 can include a view support 704, which is defined as a structure that provides support for the mobile device 102 of FIG. 1. The view support 704 can be attached or connected to a non-vertical surface of the case 702.

The view support 704 provides a support mechanism for holding the mobile device 102. The view support 704 can include a support mechanism with a support surface 706 that is non-skid allowing the mobile device 102 to be reliably supported.

The power supply system 700 can include a power plug 708, which is defined as a device that connects the power supply system 700 to an alternating current (AC) electrical source. The power plug 708 can be connected to the AC electrical source so that the power source 104 can be recharged.

The power plug 708 can be stored in the case 702. The power plug 708 can be attached to the case 702 and rotated out of the case 702 in order for the power plug 708 to be connected to an AC outlet. For example, the power plug 708 can represent a retractable or folding AC connector.

The power supply system 700 can include device ports 710, which are defined as conductors that transmit electrical power and data for external devices (not shown). The device ports 710 can be provided at a non-horizontal surface of the case 702.

The device ports 710 can be connected or coupled to the booster module 106 and the device connector 108. For example, the device ports 710 can represent Universal Serial Bus (USB) connectors, mini USB connectors, or micro USB connectors.

It has been discovered that the control unit 206 monitoring the source voltage 110 and the device voltage 112 to control the booster unit 212 improves operation of the mobile device 102 by extending run time of the mobile device 102 and thus allowing continued operation beyond expected battery life of the mobile device 102.

It has also been discovered that the booster unit 212 enabled or disabled by the control unit 206 to adjust the device voltage 112 to be compatible with an operation voltage of the mobile device 102 provides efficient auxiliary power devices thereby eliminating a need for a button to manually turn on/off the booster unit 212 and thus not unnecessarily drain the power source 104.

It has further been discovered that the reference voltage 204 provided by the voltage reference unit 202 allows the control unit 206 to effectively enable the booster unit 212 when the mobile device 102 is connected to the device connector 108 and disable the booster unit 212 when either the mobile device 102 is fully charged or when the mobile device 102 is not connected to the device connector 108.

It has yet further been discovered that the booster unit 212 controlled by the control unit 206 provides improved reliability by eliminating possible overheat of the power source 104 causing dangerous situations where batteries can leak or discharge toxic gases particularly when the source voltage 110 is not monitored by the control unit 206 and drops below a certain voltage, the booster unit 212 is unnecessarily turned on, and an increase of current drawn from the power source 104 occurs in order to maintain the device voltage 112 at a required voltage level for proper operation of the mobile device 102.

It has yet further been discovered that the view support 704 provides improved reliability by providing the support surface 706 as a non-skid surface and thus a stable surface for the mobile device 102 to be placed thereon while the mobile device 102 is being charged or used for viewing purposes.

It has yet further been discovered that the power plug 708 further extends run time of the mobile device 102 with the power plug 708 rotated out of the case 702 and connected to an AC outlet for recharging the power source 104 thus allowing the mobile device 102 continue to be charged when needed.

It has yet further been discovered that the device ports 710 provide increased storage capacity with the device ports 710 providing additional connection ports for additional devices, such as a mass storage device or a flash drive, to be connected.

Figure 8:
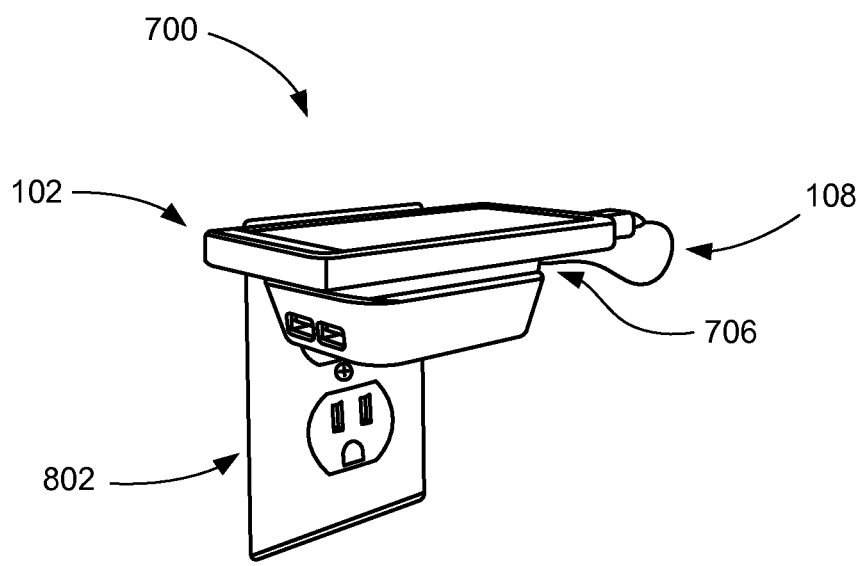
FIG. 8 is an isometric view of the power supply system connected to the mobile device.

Referring now to FIG. 8, therein is shown an isometric view of the power supply system 700 connected to the mobile device 102. The isometric view depicts the power supply system 700 connected to the mobile device 102 with the device connector 108.

The power supply system 700 can include the power plug 708 of FIG. 7 plugged or connected to an alternating current electrical outlet 802. The power plug 708 can be perpendicularly plugged into the alternating current electrical outlet 802.

The support surface 706 can be approximately perpendicular to a non-horizontal surface of the alternating current electrical outlet 802. The support surface 706 provides a support platform for the mobile device 102 to be positioned directly thereon while the mobile device 102 is connected to the power supply system 700.

Figure 9:
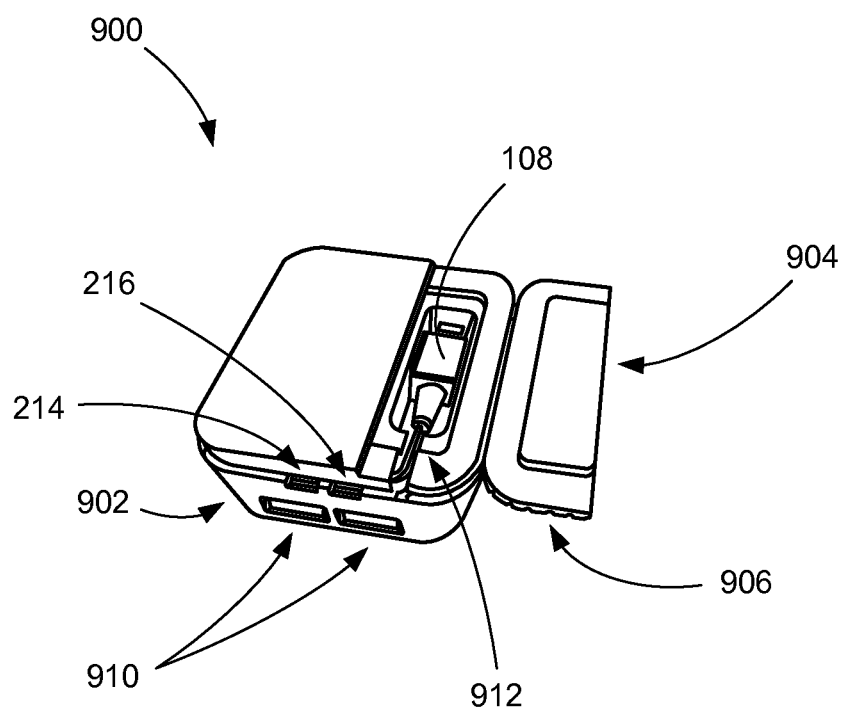
FIG. 9 is an isometric view of a power supply system in a sixth embodiment of the present invention.

Referring now to FIG. 9, therein is shown an isometric view of a power supply system 900 in a sixth embodiment of the present invention. The power supply system 900 can be similar to the power supply system 100 of FIG. 1.

Although not shown, the power supply system 900 includes the power source 104 of FIG. 1, the booster module 106 of FIG. 1, the source voltage 110 of FIG. 1, and the device voltage 112 of FIG. 1. Although not shown, the booster module 106 includes the voltage reference unit 202 of FIG. 2, the reference voltage 204 of FIG. 2, the control unit 206 of FIG. 2, the inductor 208 of FIG. 2, the diode 210 of FIG. 2, the booster unit 212 of FIG. 2, the charge indicator 214, the boost indicator 216, and the charge circuit 218 of FIG. 2.

The power supply system 900 can include a case 902, which is defined as a frame that covers electronics of the power supply system 900. The power supply system 900 can include a view support 904, which is defined as a structure that provides support for the mobile device 102 of FIG. 1. The view support 904 can be attached or connected to a non-vertical surface of the case 902.

The view support 904 provides a support mechanism for holding the mobile device 102. The view support 904 can include a support mechanism with a support surface 906 that is non-skid allowing the mobile device 102 to be reliably supported.

The power supply system 900 can include device ports 910, which are defined as conductors that transmit electrical power and data for external devices (not shown). The device ports 910 can be provided at a non-horizontal surface of the case 902.

The device ports 910 can be connected or coupled to the booster module 106 and the device connector 108. For example, the device ports 910 can represent Universal Serial Bus (USB) connectors, mini USB connectors, or micro USB connectors. Also for example, the device ports 910 can provide additional USB connector ports for additional devices including mass storage devices or Flash drives.

The power supply system 900 can include a compartment 912, which is defined as a portion of the case 902 that provides spacing for storage. The device connector 108 can be stored in the compartment 912. For example, the compartment 912 can represent cord storage.

The view support 904 can be attached to an edge of the case 902. The view support 904 can be rotated about an axis along the edge of the case 902 in an open position such that the compartment 912 can be exposed allowing the device connector 108 to be pulled out of the compartment 912. In a close position, the view support 904 can provide a platform for supporting the external device while the device connector 108 remains outside of the compartment 912 so that the device connector 108 can be connected to the external device.

It has been discovered that the control unit 206 monitoring the source voltage 110 and the device voltage 112 to control the booster unit 212 improves operation of the mobile device 102 by extending run time of the mobile device 102 and thus allowing continued operation beyond expected battery life of the mobile device 102.

It has also been discovered that the booster unit 212 enabled or disabled by the control unit 206 to adjust the device voltage 112 to be compatible with an operation voltage of the mobile device 102 provides efficient auxiliary power devices thereby eliminating a need for a button to manually turn on/off the booster unit 212 and thus not unnecessarily drain the power source 104.

It has further been discovered that the reference voltage 204 provided by the voltage reference unit 202 allows the control unit 206 to effectively enable the booster unit 212 when the mobile device 102 is connected to the device connector 108 and disable the booster unit 212 when either the mobile device 102 is fully charged or when the mobile device 102 is not connected to the device connector 108.

It has yet further been discovered that the booster unit 212 controlled by the control unit 206 provides improved reliability by eliminating possible overheat of the power source 104 causing dangerous situations where batteries can leak or discharge toxic gases particularly when the source voltage 110 is not monitored by the control unit 206 and drops below a certain voltage, the booster unit 212 is unnecessarily turned on, and an increase of current drawn from the power source 104 occurs in order to maintain the device voltage 112 at a required voltage level for proper operation of the mobile device 102.

It has yet further been discovered that the view support 904 provides improved reliability by providing the support surface 906 as a non-skid surface and thus a stable surface for the mobile device 102 to be placed thereon while the mobile device 102 is being charged or used for viewing purposes.

It has yet further been discovered that the case 902 having the compartment 912 provides improved mobility of the power supply system 900 with the compartment 912 for storing the device connector 108 when the device connector 108 is not connected to the mobile device 102.

It has yet further been discovered that the device ports 910 provide increased storage capacity with the device ports 910 providing additional connection ports for additional devices, such as a mass storage device or a flash drive, to be connected.

Figure 10:
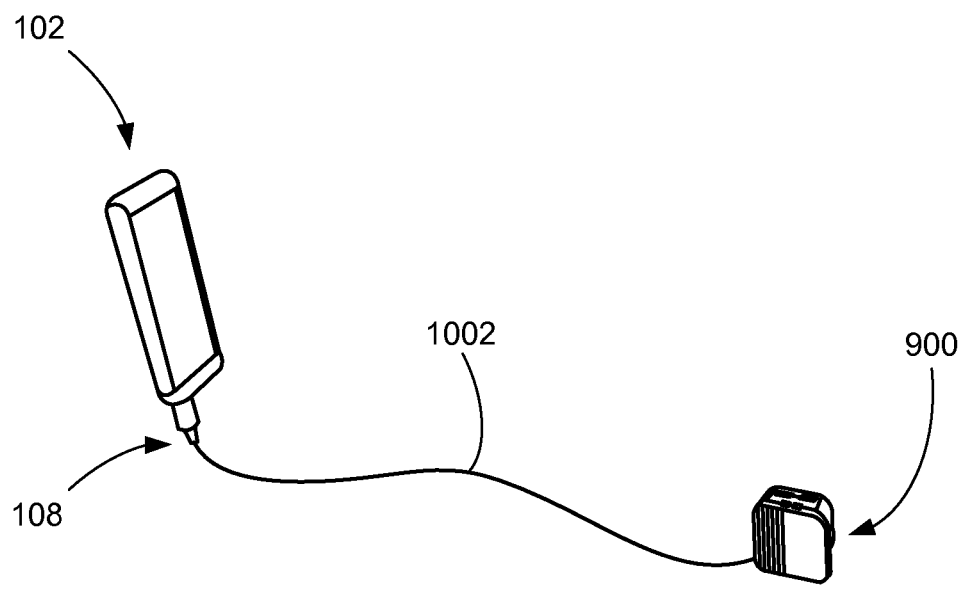
FIG. 10 is an isometric view of the power supply system connected to the mobile device.

Referring now to FIG. 10, therein is shown an isometric view of the power supply system 900 connected to the mobile device 102. The isometric view depicts the power supply system 900 connected to the mobile device 102 with the device connector 108.

The device connector 108 can include a cord 1002, which is defined as an electrical wire. The cord 1002 can include a predetermined length. The predetermined length is sufficiently long enough for the mobile device 102 to be positioned or held by a user such that the mobile device 102 can be effectively, comfortably, and clearly viewed by the user without any obstructions, while the mobile device 102 is connected to the power supply system 900.

Figure 11:
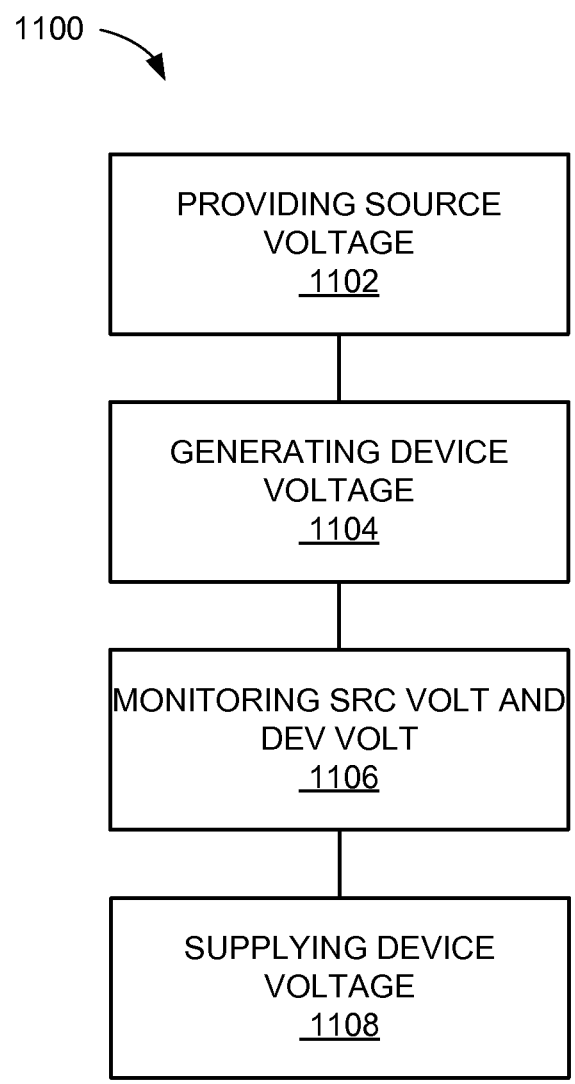
FIG. 11 is a flow chart of a method of operation of the power supply system in a further embodiment of the present invention.

Referring now to FIG. 11, therein is shown a flow chart of a method 1100 of operation of the power supply system 100 in a further embodiment of the present invention. The method 1100 includes: providing a source voltage with a power source in a block 1102; generating a device voltage with the source voltage in a block 1104; monitoring the source voltage and the device voltage in a block 1106; and supplying the device voltage to a mobile device with the device voltage controlled by a control unit in a block 1108.

Thus, it has been discovered that the power supply system of the present invention furnishes important and heretofore unknown and unavailable solutions, capabilities, and functional aspects for a power supply system with sensing mechanism. The resulting method, process, apparatus, device, product, and/or system is straightforward, cost-effective, uncomplicated, highly versatile and effective, can be surprisingly and unobviously implemented by adapting known technologies, and are thus readily suited for efficiently and economically manufacturing integrated circuit packaging systems fully compatible with conventional manufacturing methods or processes and technologies.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a power supply system comprising:
   operating the power supply system having a plurality of power supply states, the plurality of power supply states including a sleep state, a boost state, a boost complete state, and a recharge state,
   wherein the operating includes a direct transition from the boost complete state to the sleep state,
   A. wherein in the sleep state the power supply system performs:

monitoring a device voltage at a device connector to detect a decrease at a device connector indicating that a mobile device is plugged to the device connector; and transitioning to the boost state when the mobile device is detected as connected to the device connector;

B. wherein in the boost state the power supply system performs:

providing a source voltage with a power source;

receiving the source voltage with an inductor;

conducting an electric current from the power source with a diode connected in series with the inductor to the device connector;

generating a device voltage at the device connector with the source voltage by a booster circuit comprising a transistor connected in between the inductor and the diode;

monitoring the source voltage and the device voltage; and supplying the device voltage to the mobile device;

transitioning to the recharge state when the source voltage is less than a threshold voltage;

transitioning to the boost complete state when the source voltage is approximately equal to the device voltage;

C. wherein in the boost complete state the power supply system performs:

turning off the booster circuit causing a change in the source voltage; and transitioning to the sleep state when the source voltage is approximately equal to the device voltage; and D. wherein in the recharge state the power supply system performs:

recharge the power source from a charge circuit;

monitoring the source voltage and the device voltage; and transitioning to the sleep state if the mobile device is unplugged from the device connector and the device voltage is approximately equal to the source voltage.

2. The method as claimed in claim 1 further comprising detecting a decrease in the device voltage with the mobile device connected to a device connector.

3. The method as claimed in claim 1 further comprising detecting a decrease in the electric current from the power source with the mobile device approximately fully charged, wherein the power source is at least one of: internal to the power supply system, rechargeable, and replaceable.

4. The method as claimed in claim 1 further comprising detecting the source voltage below a predetermined threshold for recharging of the power source.

5. The method as claimed in claim 1 further comprising providing an external voltage to an external device.

6. A method of operation of a power supply system comprising:

operating the power supply system having a plurality of power supply states, the plurality of power supply states including a sleep state, a boost state, a boost complete state, and a recharge state, wherein the operating includes a direct transition from the boost complete state to the sleep state, A. wherein in the sleep state the power supply system performs:

monitoring a device voltage at a device connector to detect a decrease at a device connector indicating that a mobile device is plugged to the device connector; and transitioning to the boost state when the mobile device is detected as connected to the device connector;

B. wherein in the boost state the power supply system performs:

providing a source voltage with a power source;

receiving the source voltage with an inductor;

conducting an electric current from the power source with a diode connected in series with the inductor to the device connector;

generating a device voltage at the device connector with the source voltage by a booster circuit powered by the source voltage, the booster circuit comprising a transistor connected in between the inductor and the diode;

monitoring the source voltage and the device voltage; and supplying the device voltage to the mobile device;

C. wherein in the boost complete state the power supply system performs:

turning off the booster circuit causing a change in the source voltage; and transitioning to the sleep state when the source voltage is approximately equal to the device voltage; and D. wherein in the recharge state the power supply system performs:

recharge the power source from a charge circuit;

monitoring the source voltage and the device voltage; and transitioning to the sleep state if the mobile device is unplugged from the device connector and the device voltage is approximately equal to the source voltage.

7. The method as claimed in claim 6 further comprising detecting the source voltage approximately equal to the device voltage.

8. The method as claimed in claim 6 further comprising controlling a charge indicator to display a charge status of the mobile device.

9. The method as claimed in claim 6 further comprising rotating a power plug relative to a case that the power plug is in.

10. The method as claimed in claim 6 further comprising recharging the power source with a charge circuit, wherein the power source is at least one of: internal to the power supply system, rechargeable, and replaceable.

11. A power supply system comprising:

a power source for providing a source voltage;

an inductor, coupled to the power source, for receiving the source voltage;

a diode, coupled to the inductor, for conducting an electric current from the power source, the diode connected in series with the inductor;

a booster circuit, coupled to the power source, for generating a device voltage with the source voltage, the booster circuit comprising a transistor connected in between the inductor and the diode;

a hardware control logic, coupled to the booster circuit, for monitoring the source voltage and the device voltage and for controlling the booster circuit; and a device connector, coupled to the booster circuit, for supplying the device voltage to a mobile device with the device voltage controlled by the hardware control logic, wherein the hardware control logic has a plurality of power supply states, the plurality of power supply states including a sleep state, a boost state, a boost complete state, and a recharge state, and wherein the hardware control logic causes a direct transition from the boost complete state to the sleep state;
A. wherein in the sleep state the power supply system performs:
  monitoring the device voltage at a device connector to detect a decrease at the device connector indicating that the mobile device is plugged to the device connector; and
  transitioning to the boost state when the mobile device is detected as connected to the device connector;
B. wherein in the boost state the power supply system performs:
  providing the source voltage with the power source;
  receiving the source voltage with the inductor;
  conducting the electric current from the power source with the diode connected in series with the inductor to the device connector;
  generating the device voltage at the device connector with the source voltage by the booster circuit comprising the transistor connected in between the inductor and the diode;
  monitoring the source voltage and the device voltage; and
  supplying the device voltage to the mobile device;
  transitioning to the recharge state when the source voltage is less than a threshold voltage;
  transitioning to the boost complete state when the source voltage is approximately equal to the device voltage;
C. wherein in the boost complete state the power supply system performs:
  turning off the booster circuit causing a change in the source voltage; and
  transitioning to the sleep state when the source voltage is approximately equal to the device voltage; and
D. wherein in the recharge state the power supply system performs:
  recharge the power source from a charge circuit;
  monitoring the source voltage and the device voltage; and
  transitioning to the sleep state if the mobile device is unplugged from the device connector and the device voltage is approximately equal to the source voltage.

12. The system as claimed in claim 11 wherein the hardware control logic detects a decrease in the device voltage with the mobile device connected to the device connector.

13. The system as claimed in claim 11 wherein the hardware control logic detects a decrease in the electric current from the power source with the mobile device approximately fully charged, wherein the power source is at least one of: internal to the power supply system, rechargeable, and replaceable.

14. The system as claimed in claim 11 wherein the hardware control logic detects the source voltage below a predetermined threshold for recharging of the power source.

15. The system as claimed in claim 11 further comprising a device port, coupled to the booster circuit, for providing an external voltage to an external device.

16. The system as claimed in claim 11 wherein the booster circuit generates the device voltage with the booster circuit powered by the source voltage.

17. The system as claimed in claim 16 further comprising:
  a case for covering the hardware control logic; and
  a view support attached to the case for supporting the mobile device.

18. The system as claimed in claim 16 further comprising a view support having ridges for supporting the mobile device.

19. The system as claimed in claim 16 further comprising:
  a case covering the hardware control logic; and
  a power plug rotatable out of the case.

20. The system as claimed in claim 16 further comprising:
  a case, having a compartment, covering the hardware control logic; and
  a view support, attached to the case, for covering the compartment.

* * * * *

UNITED STATES PATENT AND TRADEMARK OFFICE
CERTIFICATE OF CORRECTION

PATENT NO. : 10,069,315 B2
APPLICATION NO. : 14/328657
DATED : September 4, 2018
INVENTOR(S) : Johnson et al.

It is certified that error appears in the above-identified patent and that said Letters Patent is hereby corrected as shown below:

On the Title Page

In item (73), in "Assignee", in Column 1, Line 1, delete "CleVX," and insert --ClevX,-- therefor Signed and Sealed this
Fifth Day of May, 2020

Andrei Iancu
*Director of the United States Patent and Trademark Office*